(12) United States Patent
Bertony

(10) Patent No.: US 8,469,665 B2
(45) Date of Patent: Jun. 25, 2013

(54) VERTICAL AXIS WIND TURBINE WITH TWISTED BLADE OR AUXILIARY BLADE

(75) Inventor: Joseph Bertony, Hornsby (AU)

(73) Assignee: Windworks Engineering Limited, Limassol (CY)

( * ) Notice: Subject to any disclaimer, the term of this patent is extended or adjusted under 35 U.S.C. 154(b) by 1224 days.

(21) Appl. No.: 11/577,639

(22) PCT Filed: Oct. 19, 2005

(86) PCT No.: PCT/AU2005/001621
§ 371 (c)(1),
(2), (4) Date: Sep. 20, 2007

(87) PCT Pub. No.: WO2006/063380
PCT Pub. Date: Jun. 22, 2006

(65) Prior Publication Data
US 2008/0095631 A1  Apr. 24, 2008

(30) Foreign Application Priority Data

Oct. 20, 2004  (AU) .................... 2004906051
Feb. 17, 2005  (AU) .................... 2005900746
May 6, 2005    (AU) .................... 2005902305

(51) Int. Cl.
*F03D 7/06*  (2006.01)

(52) U.S. Cl.
USPC ............. 416/41; 416/132 B; 415/4.2; 415/4.4

(58) Field of Classification Search
USPC ............. 416/40, 41, 62, 132 B; 415/4.2, 4.4, 415/76; 29/44, 55
See application file for complete search history.

(56) References Cited

U.S. PATENT DOCUMENTS

| 252,947 | A | * | 1/1882 | Jones et al. | 416/23 |
|---|---|---|---|---|---|
| 1,766,765 | A | * | 6/1930 | Savonius | 416/132 R |
| 4,359,311 | A | * | 11/1982 | Benesh | 416/197 A |
| 4,362,470 | A | * | 12/1982 | Locastro et al. | 416/197 A |
| 4,415,312 | A | * | 11/1983 | Brenneman | 416/119 |
| 5,044,878 | A | * | 9/1991 | Wilhelm | 415/4.2 |
| 5,193,978 | A | * | 3/1993 | Gutierrez | 416/24 |

(Continued)

FOREIGN PATENT DOCUMENTS

| AU | 64728/90 | 4/1991 |
|---|---|---|
| CA | 1236030 | 5/1988 |
| DE | 4016622 | 11/1991 |
| GB | 1518151 | 7/1978 |

(Continued)

*Primary Examiner* — Edward Look
*Assistant Examiner* — Aaron R Eastman
(74) *Attorney, Agent, or Firm* — Novak Druce Connolly Bove + Quigg LLP

(57) ABSTRACT

A vertical axis wind turbine (1) comprises three vertically extending sails (8) where each sail (8) comprises a strip (80) of substantially constant width. The opposite ends of each sail (8) are longitudinally twisted to have a pitch angle of approximately 90 degrees. The turbine (1) further comprises a vertically extending central core (7) and a vertically extending opening (9) between each sail (9) and the core (7). Also disclosed is an improvement in a vertical axis wind turbine (91) having at least one main blade (94) each of which has a longitudinal extent and a longitudinally extending radially outermost edge (924). The improvement comprises a longitudinally extending auxiliary blade (944) spaced from the main blade (94) to define a venturi inducing gap (99) between the main blade (94) and the auxiliary blade (944) whereby the turbine (91) has a zone of influence which extends radially beyond the maximum radial extent of the blades.

10 Claims, 11 Drawing Sheets

U.S. PATENT DOCUMENTS

| | | | |
|---|---|---|---|
| 5,328,330 A * | 7/1994 | Monroe | 416/62 |
| 7,802,967 B2 * | 9/2010 | Krauss et al. | 416/203 |
| 2004/0258525 A1 * | 12/2004 | Clark | 416/132 B |
| 2006/0198724 A1 * | 9/2006 | Bertony | 415/4.4 |
| 2006/0275105 A1 * | 12/2006 | Roberts et al. | 415/4.2 |
| 2007/0248450 A1 * | 10/2007 | Migler | 415/4.4 |
| 2011/0025071 A1 * | 2/2011 | Cortesi et al. | 290/55 |

FOREIGN PATENT DOCUMENTS

| | | |
|---|---|---|
| JP | 2001-065446 | 3/2001 |
| JP | 332716 A * | 11/2004 |
| WO | 80/00733 | 4/1980 |
| WO | 03-058061 | 7/2003 |
| WO | WO 03/058061 A1 * | 7/2003 |
| WO | 2004-092578 | 10/2004 |

* cited by examiner

VERTICAL AXIS WIND TURBINE WITH TWISTED BLADE OR AUXILIARY BLADE

CROSS-REFERENCE TO RELATED APPLICATIONS

This application is a National Stage of PCT/AU2005/001621 filed Oct. 19, 2005 which in turn claims priority from Australian Applications 2004906051 filed Oct. 20, 2004, 2005900746 filed Feb. 17, 2005 and 2005902305, filed May 6, 2005 disclosures of which are incorporated herein by reference.

FIELD OF THE INVENTION

The present invention relates to wind turbines and, in particular, to vertical axis wind turbines.

BACKGROUND ART

It is known from the present applicant's earlier international patent application published under No. WO 03/058061, to provide a vertical axis wind turbine with three blades or sails spaced at an angle of substantially 120° which is able to provide a substantially constant torque output. In particular, the leading surface of the sails develops lift (in a manner similar to the headsail of a yacht) whilst the trailing surface of the blades develops drag (in the manner of the mainsail of a yacht sailing before the wind).

The present invention also relates to turbines including the Savonius turbine, the vertical axis turbine of WO 03/058061, and to the vertical axis wind turbine disclosed in Australian Patent Application No. 2004 906 051 (lodged 20 Oct. 2004 and presently at the priority date of the present application). In the two last mentioned specifications, the turbine has one or more stages and each stage has preferably three blades each of which functions in a manner somewhat akin to a sail so that an aerodynamic force is generated by the blades which rotates the turbine, irrespective of whether the blades are moving in the direction from which the wind is blowing or are moving into the direction from which the wind is blowing. This is explained in more detail in the abovementioned PCT specification.

In general, the larger the radial extent of the blades of the turbines, the greater the power able to be generated by the turbine. However, as the radial extent of the blades increases, so do the mechanical loads on the blades, the cost of construction, and like factors.

OBJECT OF THE INVENTION

The present invention has been devised in order to provide a turbine which is easy to fabricate and which provides various aerodynamic advantages. It is an object of preferred embodiments of the invention to provide a turbine of increased power for a given radial dimension.

SUMMARY OF THE INVENTION

In accordance with a first aspect of the present invention there is disclosed a vertical axis wind turbine comprising three vertically extending sails, each said sail comprising a strip of substantially constant width, opposite ends of each said sail being longitudinally twisted to have a pitch angle of approximately 90°, and said turbine further comprising a vertically extending central core and a vertically extending opening between each sail and the core.

In accordance with another aspect of the present invention there is disclosed in a vertical axis wind turbine having at least one main blade each of which has a longitudinal extent and a longitudinally extending radially outermost edge, the improvement comprising a longitudinally extending auxiliary blade spaced from said main blade and extending radially beyond said outermost edge to define a venturi inducing passage between said main blade and said auxiliary blade whereby said turbine has a zone of influence which extends radially beyond the maximum radial extent of said blades.

BRIEF DESCRIPTION OF THE DRAWINGS

Preferred embodiments of the present invention will now be described, by way of example only, with reference to the accompanying drawings in which.

DETAILED DESCRIPTION

Figure 1:
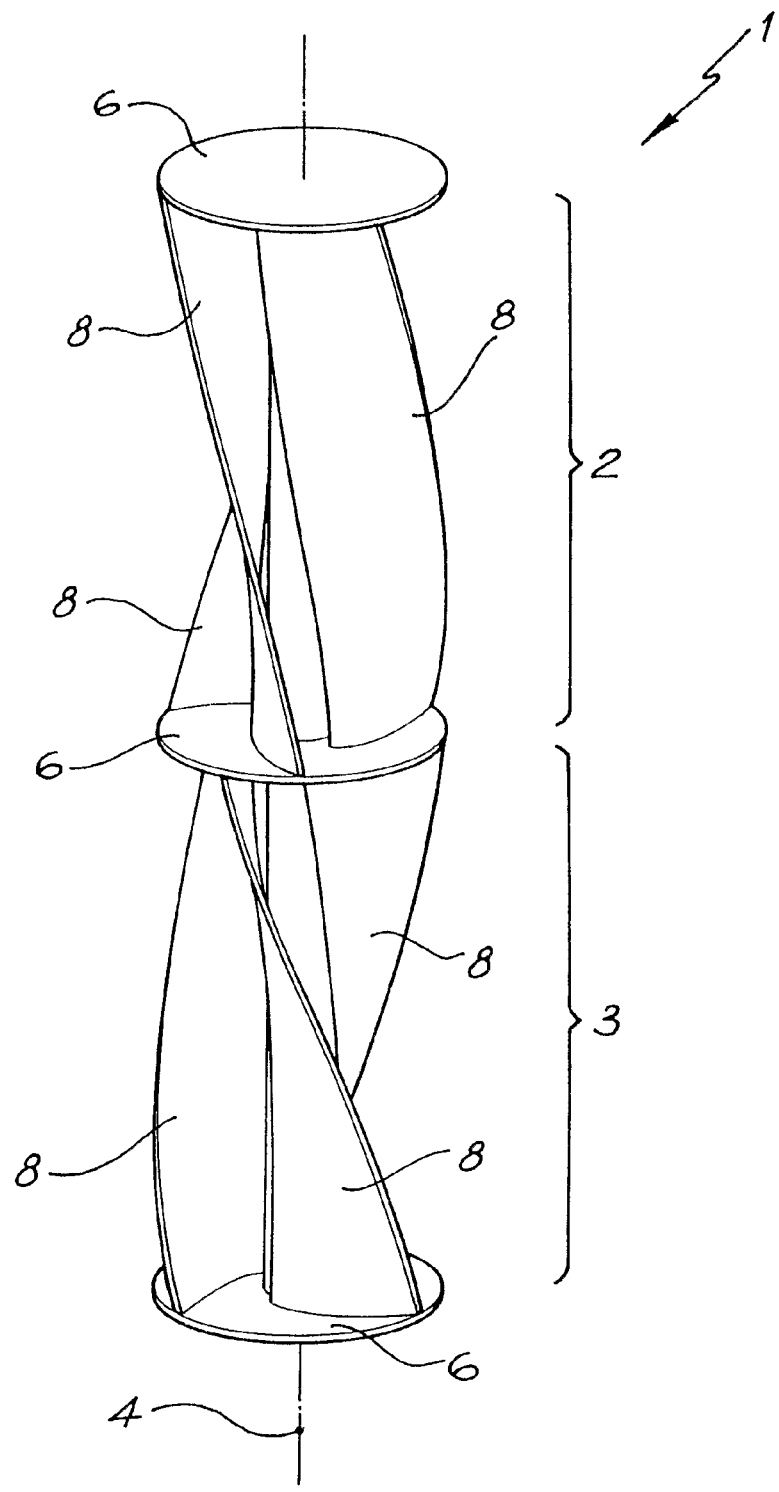
FIG. 1 is a schematic perspective view of a two stage wind turbine in accordance with a first preferred embodiment of the present invention.

As seen in FIG. 1, the turbine 1 of the first preferred embodiment comprises two vertically arranged stages 2 and 3 which rotate about a vertical axis 4. The upper stage 2 is substantially identical to the lower stage 3 but is rotated by substantially 60° about the vertical axis 4.

Each stage 2, 3 has a pair of spaced apart substantially horizontal discs 6 and a central cylindrical core 7 (FIG. 3) which is co-axial with the vertical axis 4. In addition, each stage 2, 3 has three blades or sails 8 set at an angle of 120° around the vertical axis 4 and which are best illustrated in FIGS. 3 and 4.

Figure 2:
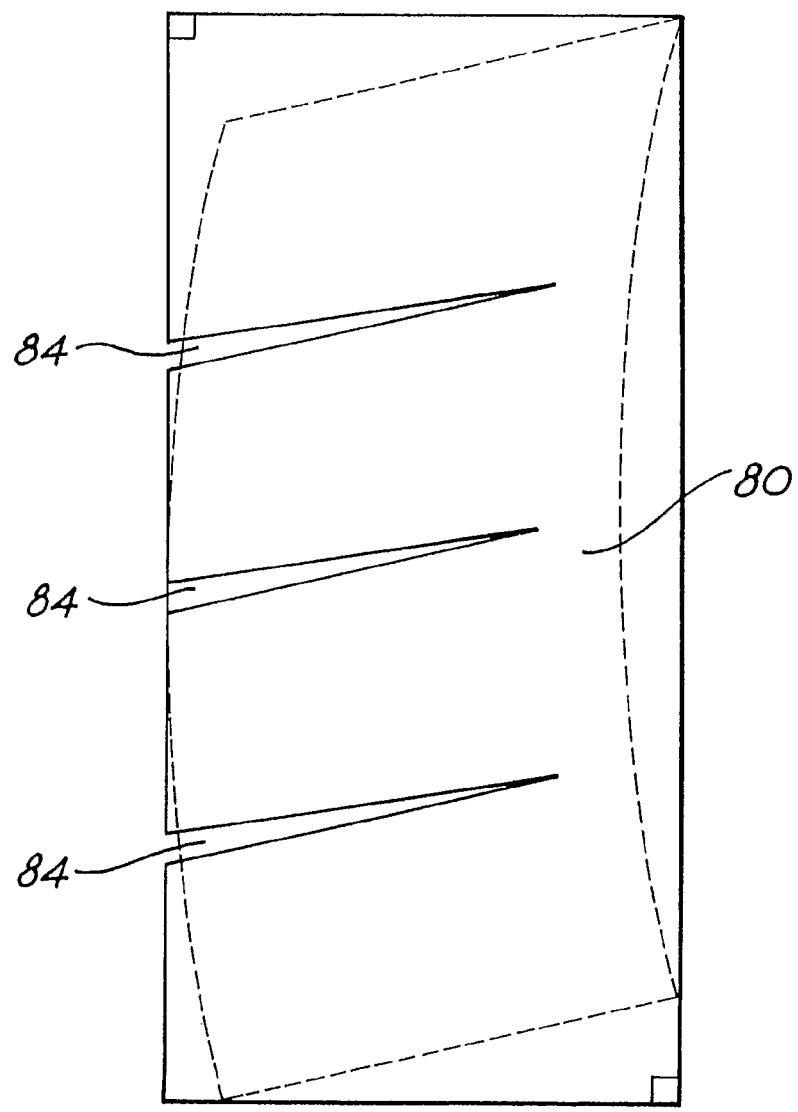
FIG. 2 is a side elevation of a planar untwisted strip from which a single sail is formed.
Figure 3:
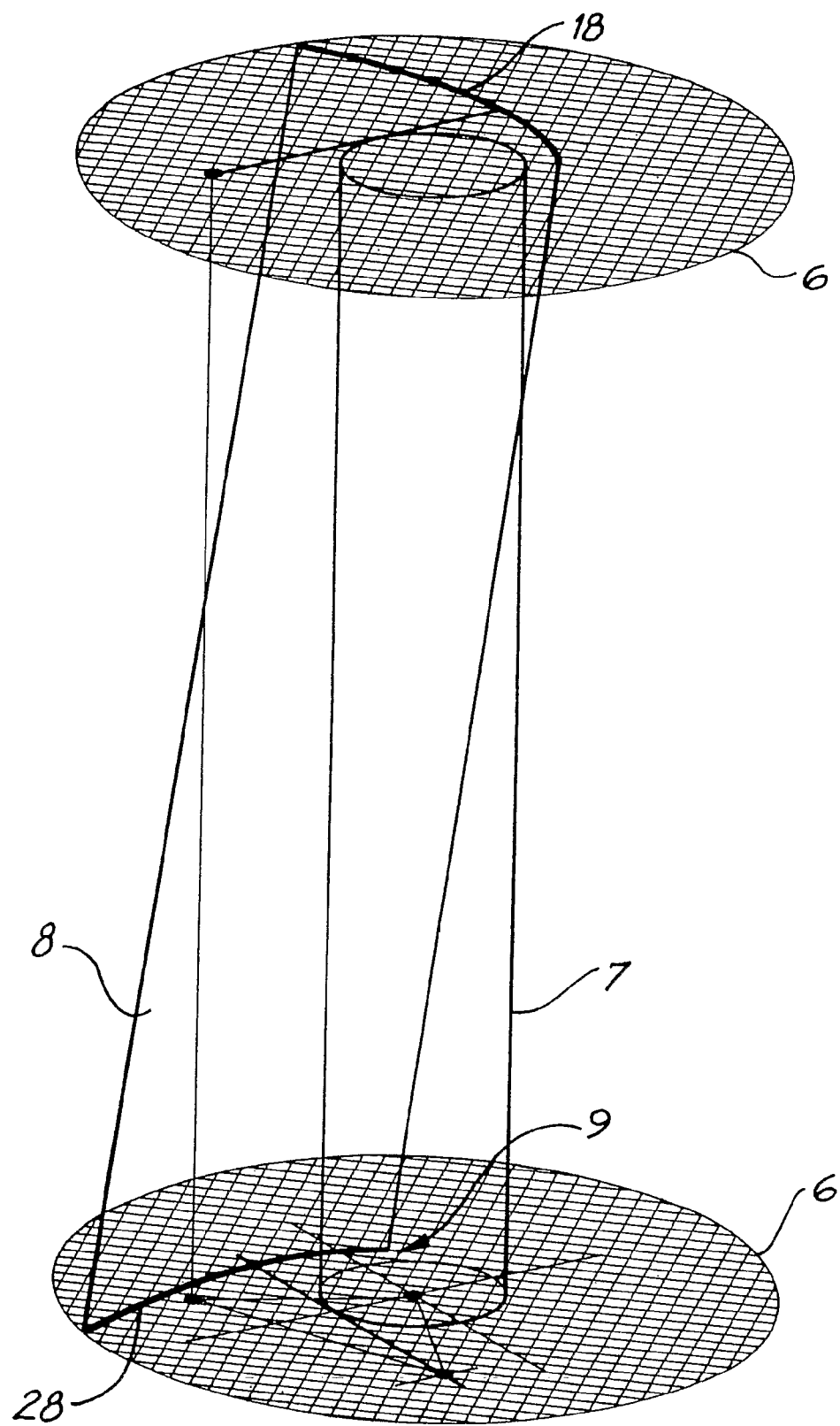
FIG. 3 is computer generated perspective view showing a single one of the sails of one stage of the turbine of FIG. 1.
Figure 4:
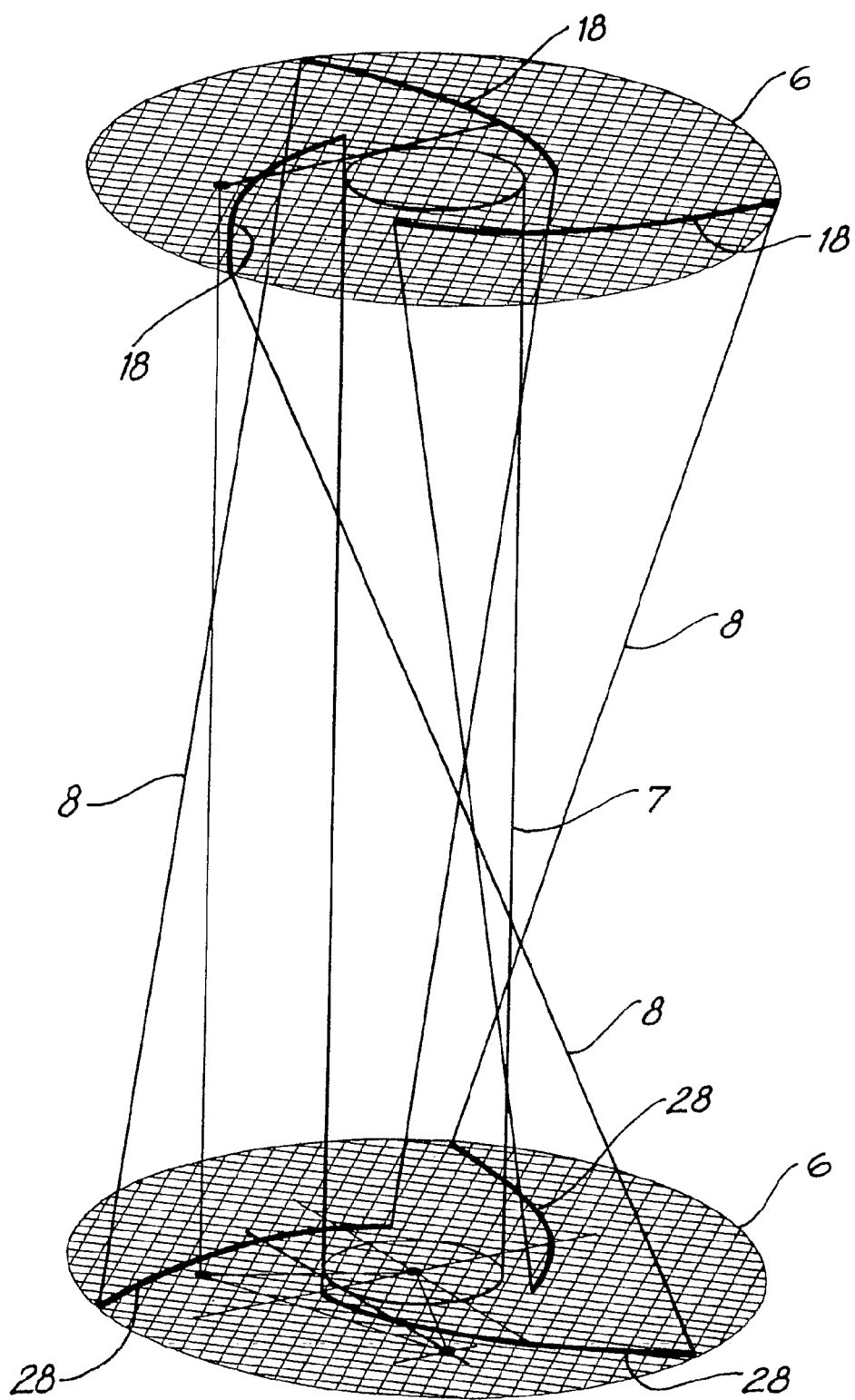
FIG. 4 is a view similar to FIG. 3 but showing all three of the sails of the single stage.

With reference to FIGS. 2 and 3, it will be seen that each sail 8 is fabricated from a relatively thin planar strip 80 of approximately constant width and which is not rectangular. As seen in FIG. 2 each edge of the strip 80 is curved when the strip 80 is in its planar condition. The strip 80 is able to be twisted about its longitudinal extent and also curved or warped into the desired shape for the sail 8. In particular, each end of the strip 80 is curved to lie in a quarter ellipse (that is a portion of an ellipse extending between one major axis and one minor axis).

These two elliptical curves are then twisted so that the major axis of each part ellipse is substantially perpendicular to the major axis of the other part ellipse. This imparts a longitudinal twist to the sail 8 with a pitch angle of 90°. Each planar strip 80 includes a plurality of expansion elements 84. The expansion elements 84 are cut or otherwise disposed through the strip 80 to allow for movement of the strip 80 in the plane thereof in response to twisting the strip 80.

The expansion elements 84 shown in FIG. 2 are in the form of shaped slots extending through the strip 80. Once the strip as being twisted into position as described above, the expansion elements 84 can be filled in.

FIG. 3 illustrates a single sail 8 in its final position with the expansion elements 84 filled in. It follows from the above that the curved surface of each sail 8 is not a simple geometric shape such as a cylindrical surface.

As best seen in FIG. 4, each of the sails 8 extends between a lower disc 6 and an upper disc 6 but does not meet with the central core 7. Thus there is a vertically extending gap or opening 9 between each of the sails 8 and the central core 7.

The existence of the opening 9 between the sails 8 and the central core 7 constitutes a substantial difference between the arrangements of the present invention and the abovementioned prior art specification. In particular, the opening 9 permits air impinging on one sail 8 to be directed onto another so as to increase the rotational force created by wind flowing onto the stages 2, 3.

The discs 6 are not essential and can be dispensed with if desired. However, the discs 6 do provide additional structural rigidity for the turbine.

Wind tunnel testing of a prototype indicates good power output and, in particular, as relatively high efficiency which is a substantially linear function of wind speed with efficiency increasing with increasing wind speed.

Figure 5:
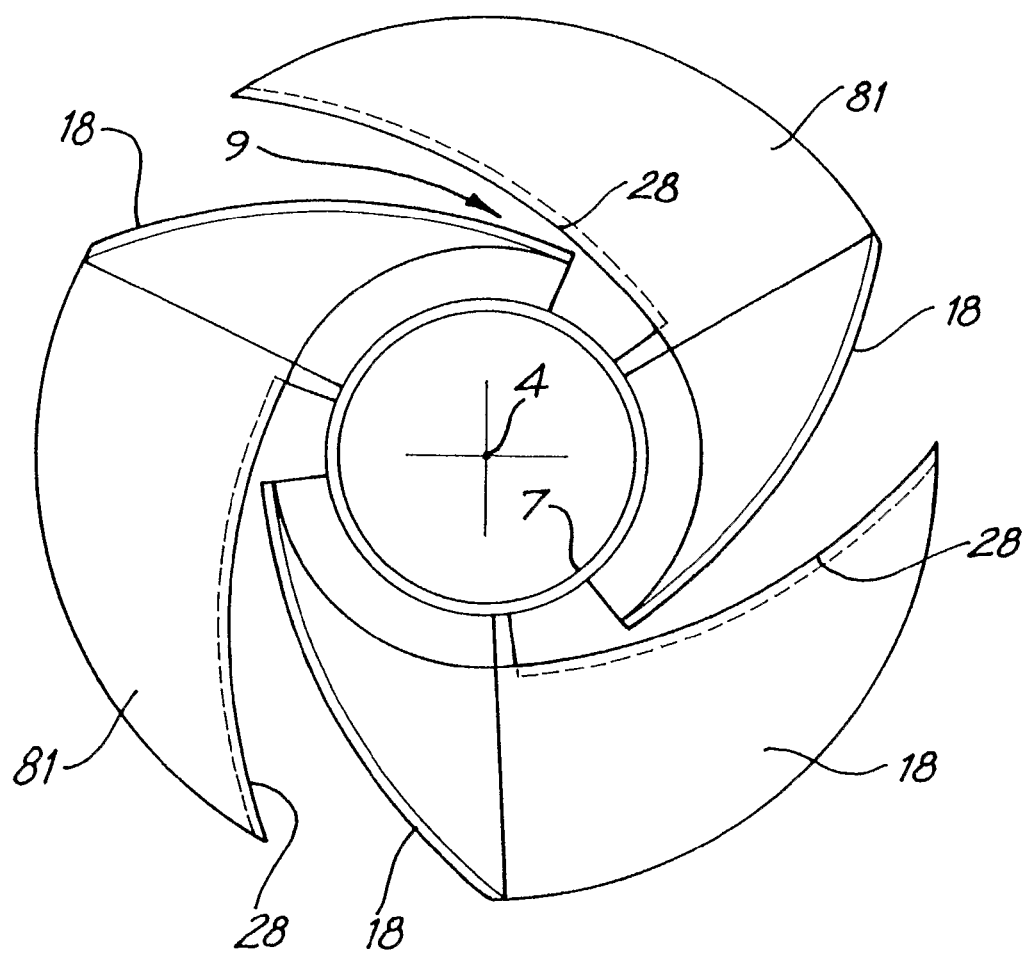
FIG. 5 is a schematic plan view of the three sails in a single stage of a second preferred embodiment.
Figure 6:
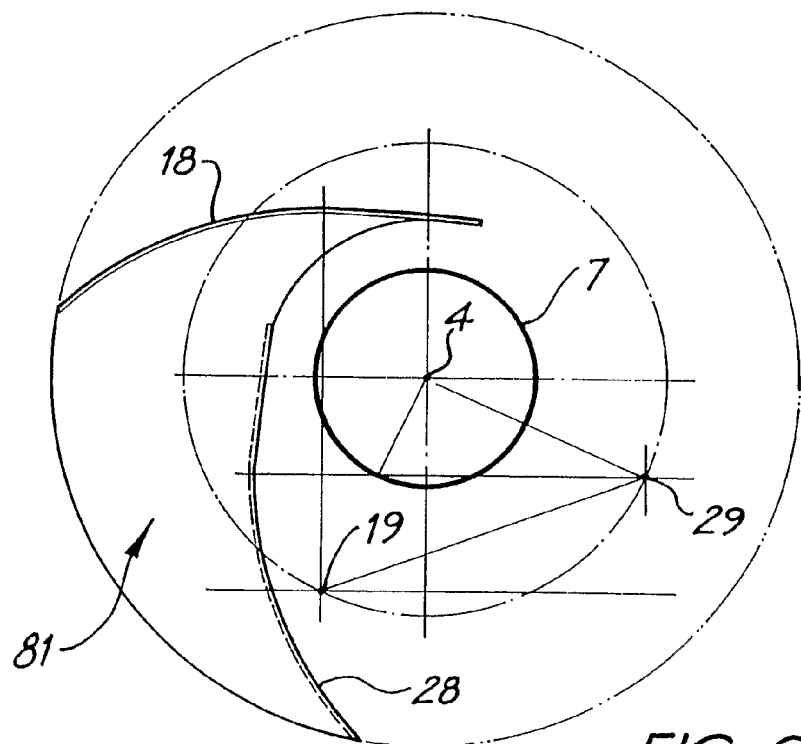
FIG. 6 is a view similar to FIG. 5 but showing the centres from which the curved upper edges and lower edges of the sails are generated.
Figure 7:
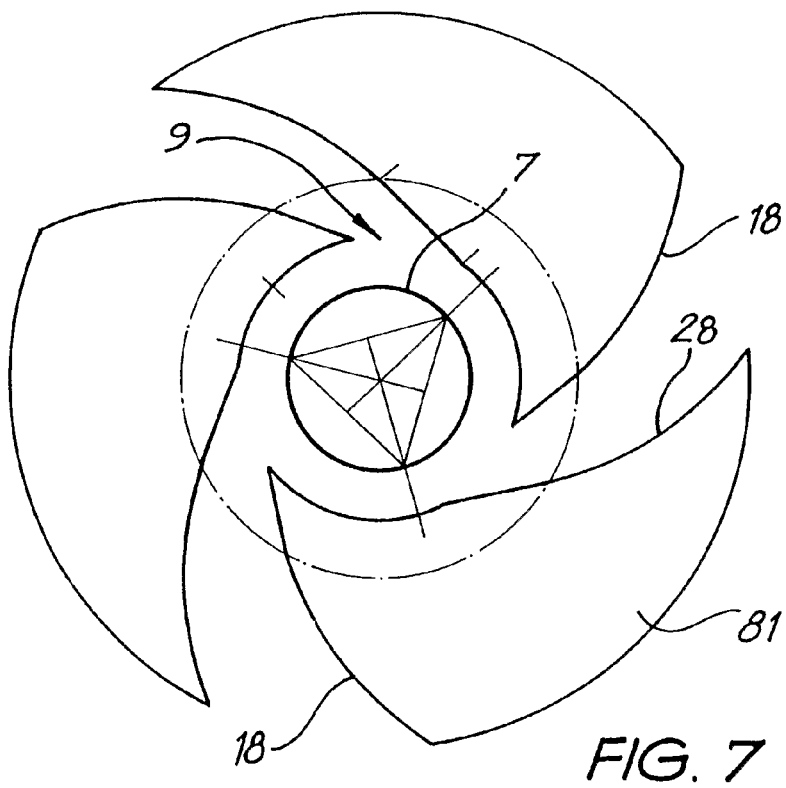
FIG. 7 is a further plan view of the sails showing the projected area of the sails of the second embodiment.

Turning now to FIGS. 5-7, the second embodiment is illustrated which has three sails 81. The top edge 18 and bottom edge 28 of each of the sails 81 is illustrated in plan. Each of the top edge 18 and bottom edge 28 constitutes an arc of a circle (rather than an ellipse as in the first embodiment) which is drawn from a corresponding rotational centre 19, 29. The positions of the centres 19 and 29 relative to the vertical axis 4 are as illustrated in FIG. 6.

Figure 8:
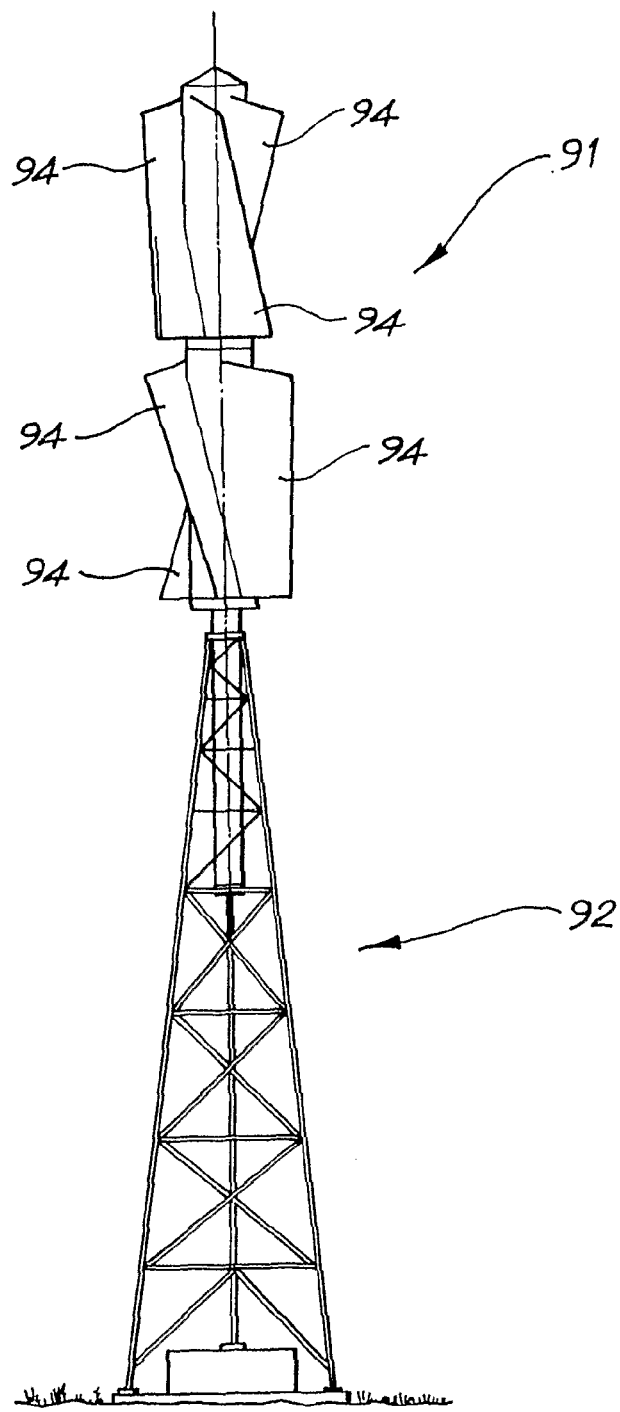
FIG. 8 is a side elevation of a multi stage vertical axis wind turbine of the prior art (being a reproduction of FIG. 13 of the abovementioned PCT specification)

FIG. 8 illustrates a prior art vertical axis wind turbine 91 mounted atop a tower 92. The turbine 91 has two stages but in principle any number of stages from one upwards can be utilized. Each stage has three blades 94 which are aerodynamically shaped so as to be driven by the wind, irrespective of the wind direction. The greater the radial extent of the blades 94, the greater the power of the wind turbine.

Figure 9:
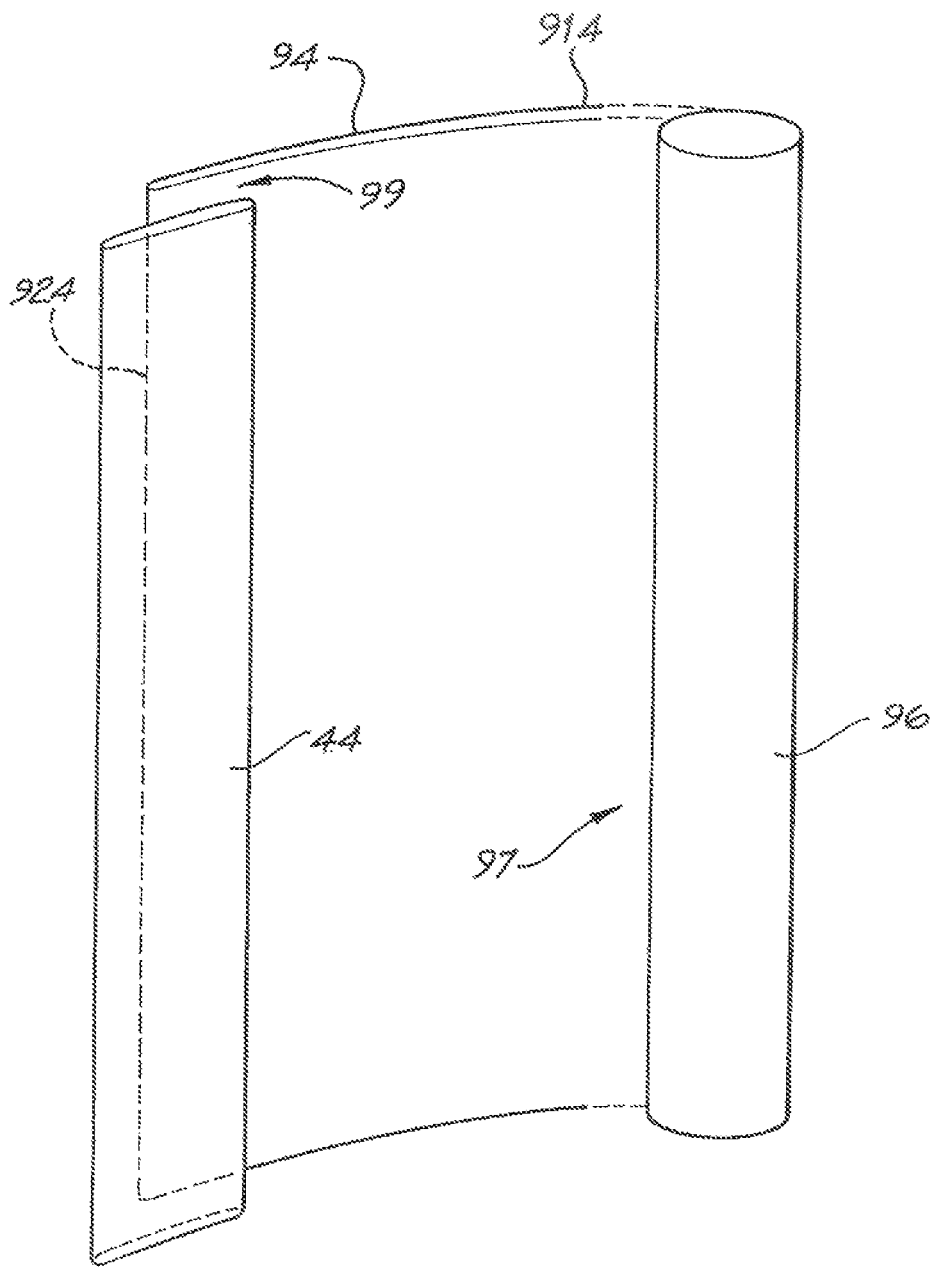
FIG. 9 is a schematic perspective view of a blade of a wind turbine and having an auxiliary blade in accordance with a third preferred embodiment of the present invention.

In FIG. 9 there is shown a schematic perspective view of a blade of a wind turbine having an auxiliary blade in accordance with the third preferred embodiment. A single (main) blade 94 is schematically illustrated which extends radially from a central core 96. Not indicated in FIG. 9, but illustrated and explained in the two abovementioned patent applications, there is preferably a 90° twist between the upper and lower edges of the blade 94. As indicated by broken lines in FIG. 9 there may or may not be a slot 97 between the radially inner portion 914 of the main blade 94 and the central core 96. The benefits of the present invention are obtained irrespective of whether such a slot 97 is present or not.

The radially outer edge 924 of the main blade 94 conventionally determines the radial extent of the turbine. However, in the embodiment illustrated in FIG. 10 an auxiliary blade 944 is provided which is spaced from the radial outer edge 924 and preferably extends radially beyond the radial outer edge 924. The auxiliary blade 944 is inwards of the main blade 94.

Figure 10:
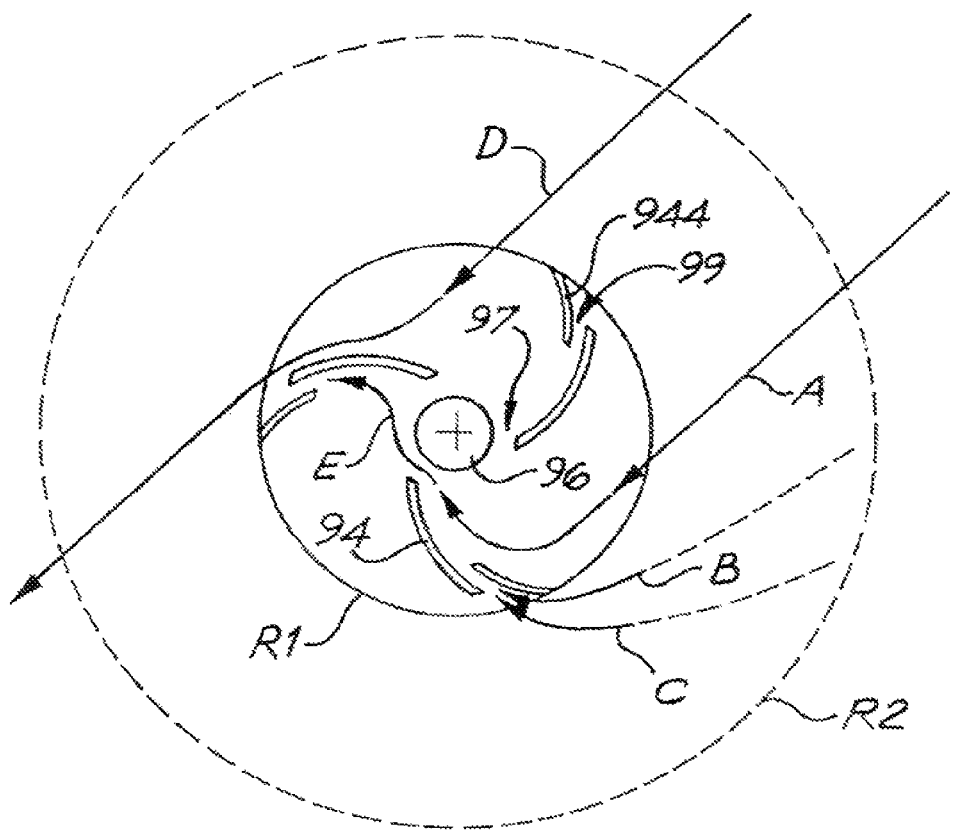
FIG. 10 is a plan view of a vertical axis wind turbine incorporating auxiliary blades as illustrated in FIG. 9.

Turning now to FIG. 10, three main blades 94 each with an auxiliary blade 944 as illustrated in FIG. 9 are illustrated in FIG. 10 together with an indication of wind direction. The blades 94 and 944 at the two o'clock position in FIG. 10 are pointing directly into the wind and thus play no role this particular instant. The main blade 94 and auxiliary blade 944 at the five o'clock position in FIG. 10 are functioning in the manner of a sail which is sailing down wind in that the main blade 94 and auxiliary blade 944 are both catching the wind and being driven before the wind which is indicated by arrow A in FIG. 10.

However, the passage of the air past the gap 99 between the main blade 94 and the auxiliary blade 944 generates a venturi effect which draws additional air flows as indicated by arrows B and C in FIG. 10 onto the rearward face of the main blade 94.

Similarly, the wind incident on the leading face of the main blade 94 shown at the nine o'clock position in FIG. 10 generates lift on that main blade as it passes over the curved advancing surface. In addition, this movement of air past the auxiliary blade 944 also draws a flow indicated by arrow E in FIG. 10 as a consequence of venturi effect into the gap 99 between the main blade 94 and the auxiliary blade 944. This additional flow E also increases the forces applying to the main blade 94.

It is particularly desirable there be the slot 97 between each of the main blades 94 and the central core 96 so that the combined flow A, B and C indicated in FIG. 10 can pass through that slot 97 and thereby contribute to the flow E also illustrated in FIG. 10.

It will be apparent from FIG. 10 that the actual radius of the turbine is that indicated as R1 in FIG. 10, however, because of the venturi effect of the auxiliary blades 944, the effective radius of the turbine is increased as indicated by dotted lines to an effective radius of R2. This means that the power of the turbine is much increased over what one would expect of a turbine of diameter R1 formed from main blades 4 only.

Figure 11:
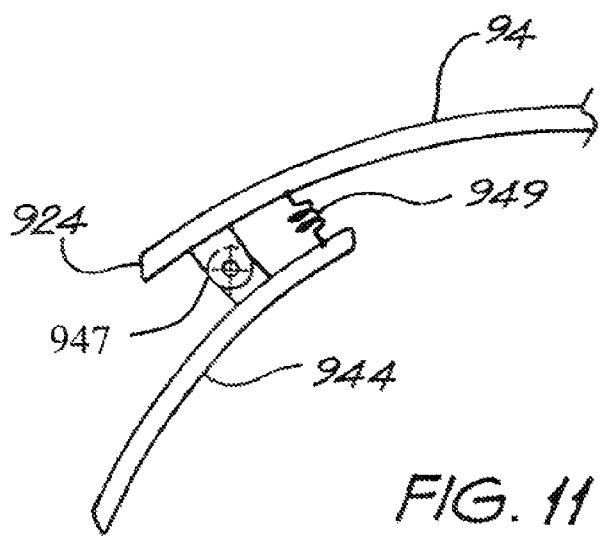
FIG. 11 is a partial plan view illustrating a pivoted auxiliary blade of a fourth preferred embodiment.

Turning now to FIG. 11, a modified arrangement according to the fourth preferred embodiment is indicated in which the auxiliary blades 944 are pivoted as indicated by hinge 947. In addition, adjacent the radially inner edge of the auxiliary blade 944 is positioned a spring 949 which resiliently biases the auxiliary blade 944. The spring 949 is schematically illustrated in FIG. 11 and can be either a tension spring or a compression spring depending upon the direction in which it is desired to pivot the auxiliary blade 944 with increasing wind velocity. Alternatively, the spring(s) 949 can be replaced by actuator(s) such as a pneumatic ram or an electro mechanical device which can be automatically controlled.

Figure 12:
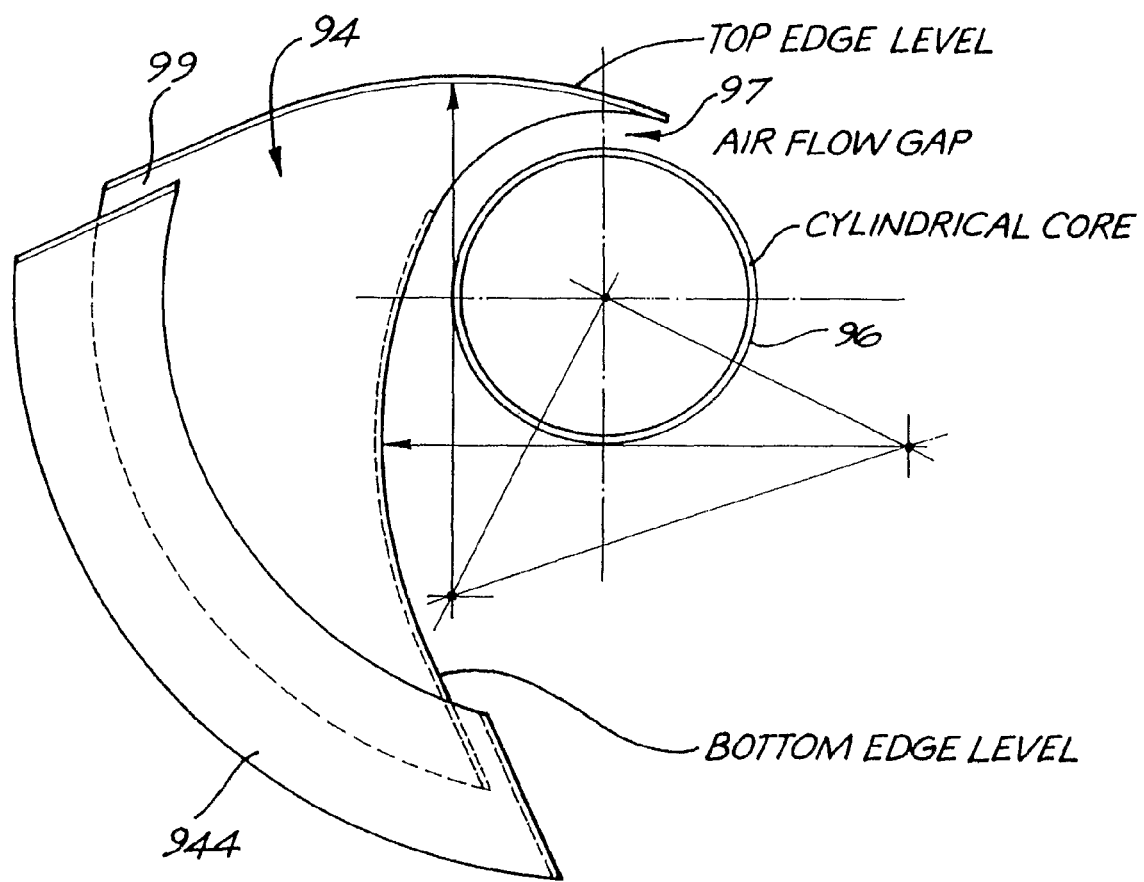
FIG. 12 is a plan view of one blade only of the fourth preferred embodiment.

Turning now to FIG. 12, one blade only of a three blade stage of a two stage turbine is shown in plan view. The main blade 94 is twisted through 90° from its upper edge relative to the lower edge as explained in the abovementioned patent applications. The auxiliary blade 944 follows this twist and the slot 97 (marked AIR FLOW GAP in FIG. 12) is also provided. In this embodiment the auxiliary blade 944 is fixed. The three blades are arranged with equal 120° spacing about the cylindrical central core 96.

Figure 13:
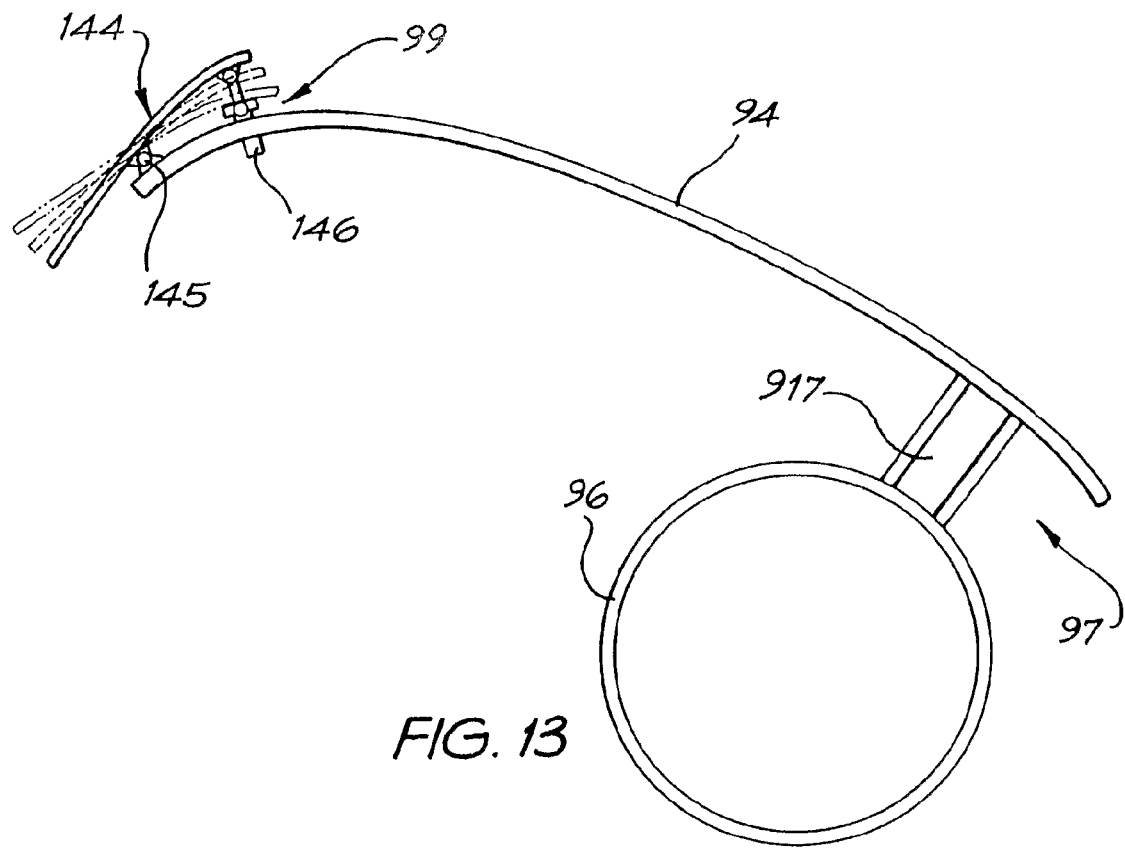
FIG. 13 is a plan view of one blade only of a turbine of a further embodiment, and FIG. 14 repeats FIG. 10 but for the further embodiment.

Finally, turning to FIG. 13, one blade of a turbine of a further embodiment is schematically illustrated in plan view of a top edge of the blade. The main blade central core 96 and slot 97 are as before. There are a number of connectors 917 of short longitudinal extent which connect the main blade 94 to the central core 96, and one of these is illustrated in FIG. 13.

Figure 14:
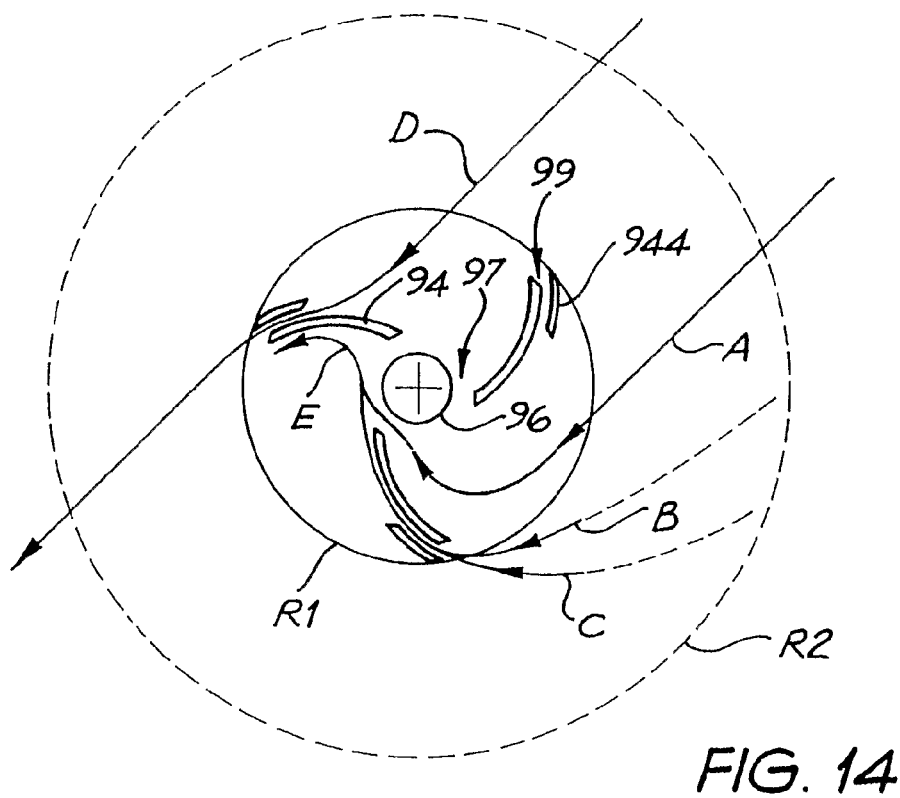

In particular in FIG. 13, the auxiliary blade 144 is illustrated and is located outwards of the main blade 94 (in contra distinction to the auxiliary blades 944 of FIGS. 9-12 which are located inwards of the corresponding main blade 94). Again a venturi effect is achieved by the auxiliary blade 144 and this is illustrated in FIG. 14 which is analogous to FIG. 10.

In FIG. 13 the auxiliary blade 144 is pivoted at 145 and is movable by means of an electro-mechanical actuator 146. The blade 144 is shown in three possible positions in FIG. 13, one without dots, a second position with closely spaced dots and a third position with widely spaced dots.

Thus, the auxiliary blades 944, 144 can be positioned either radially inwardly or outwardly of the edge 924 of the main blade 94, if desired. Also the gap 99 whilst preferably of substantially uniform width can vary (for example by means of a tapering width).

The foregoing describes only some embodiments of the present invention and modifications, obvious to those skilled in the aerodynamic arts, can be made thereto without departing from the scope of the present invention. For example, the leading face of the main blade 94 can be polished whilst the trailing face of the main blade 94 can be roughened to thereby enhance the forces acting on the main blade 94.

The term "comprising" (and its grammatical variations) as used herein is used in the inclusive sense of "including" or "having" and not in the exclusive sense of "consisting only of".

The invention claimed is:

1. A vertical axis wind turbine comprising:
   at least one main blade each of which has a longitudinal extent and a longitudinally extending radially outermost edge;
   a longitudinally extending auxiliary blade spaced from said main blade to define a venturi inducing gap between said main blade and said auxiliary blade whereby said turbine has a zone of influence which extends radially beyond the maximum radial extent of said blades and wherein said auxiliary blade is movably mounted to said main blade to narrow or expand said gap.

2. The wind turbine according to claim 1 wherein said auxiliary blade is pivoted to said main blade to vary said gap between said main blade and said auxiliary blade.

3. The wind turbine according to claim 2 wherein said auxiliary blade is pivoted to said main blade any configured to vary said gap between said main blade and said auxiliary blade.

4. The wind turbine according to claim 1 wherein said auxiliary blade is resiliently biased.

5. The wind turbine according to claim 1 wherein said auxiliary blade is located on the trailing side of said main blade relative to the direction of motion of the turbine.

6. The wind turbine according to claim 1 wherein said auxiliary blade extends radially beyond said main blade radially outermost edge.

7. The wind turbine according to claim 1 wherein said auxiliary blade does not extend radially beyond said main blade radially outermost edge.

8. The wind turbine according to claim 1 wherein said auxiliary blade is located on the leading side of said main blade relative to the direction of motion of the turbine.

9. The wind turbine according to claim 1 and comprising a plurality of stages.

10. The vertical axis wind turbine according to claim 1, wherein said auxiliary blade does not extend radially beyond said main blade radially outermost edge.

* * * * *